United States Patent
Petruzzelli (10) Patent No.: US 7,502,587 B2
(45) Date of Patent: Mar. 10, 2009

(54) METHOD AND DEVICE FOR BAND TRANSLATION

(75) Inventor: Edmund F. Petruzzelli, Englewood, CO (US)

(73) Assignee: EchoStar Technologies Corporation, Englewood, CO (US)

( * ) Notice: Subject to any disclaimer, the term of this patent is extended or adjusted under 35 U.S.C. 154(b) by 543 days.

(21) Appl. No.: 11/140,330

(22) Filed: May 27, 2005

(65) Prior Publication Data

US 2006/0031894 A1 Feb. 9, 2006

Related U.S. Application Data

(60) Provisional application No. 60/575,579, filed on May 28, 2004.

(51) Int. Cl.
*H04H 20/74* (2008.01)
(52) U.S. Cl. ............... 455/3.02; 725/100; 725/126; 725/131; 348/725; 348/731
(58) Field of Classification Search ............. 455/3.02
See application file for complete search history.

(56) References Cited

U.S. PATENT DOCUMENTS

| | | | |
|---|---|---|---|
| 6,430,233 B1 * | 8/2002 | Dillon et al. ............ 375/316 |
| 6,704,549 B1 | 3/2004 | Sorrells et al. | |
| 6,785,656 B2 * | 8/2004 | Patsiokas et al. ......... 704/500 |
| 6,868,255 B1 * | 3/2005 | Chanteau et al. ........ 455/12.1 |
| 7,260,356 B2 * | 8/2007 | Helstrom et al. ........ 455/3.02 |
| 7,271,640 B2 | 9/2007 | Bargroff | |
| 7,394,806 B2 | 7/2008 | Beshai et al. | |
| 2002/0175998 A1 * | 11/2002 | Hoang ................... 348/148 |
| 2002/0191105 A1 * | 12/2002 | Walters .................. 348/448 |
| 2003/0058810 A1 | 3/2003 | Petronic | |
| 2003/0212999 A1 | 11/2003 | Cai | |
| 2004/0209584 A1 | 10/2004 | Bargroff et al. | |
| 2004/0214537 A1 * | 10/2004 | Bargroff et al. ......... 455/136 |
| 2005/0005296 A1 * | 1/2005 | Bargroff et al. ........... 725/63 |
| 2005/0013584 A1 * | 1/2005 | Takaoka et al. .......... 386/46 |
| 2005/0081245 A1 * | 4/2005 | Arad et al. ............. 725/100 |
| 2005/0155082 A1 * | 7/2005 | Weinstein et al. ........ 725/131 |
| 2005/0169255 A1 * | 8/2005 | Shikomura et al. ....... 370/352 |
| 2005/0179487 A1 | 8/2005 | Lee et al. | |
| 2005/0193419 A1 | 9/2005 | Lindstrom et al. | |
| 2006/0031375 A1 * | 2/2006 | Danker et al. ........... 709/207 |
| 2006/0048197 A1 * | 3/2006 | Petruzzelli .............. 725/100 |
| 2007/0087712 A1 * | 4/2007 | Bargroff et al. ......... 455/131 |
| 2007/0110439 A1 | 5/2007 | Beshai et al. | |
| 2007/0111661 A1 * | 5/2007 | Bargroff et al. ......... 455/13.3 |
| 2007/0141982 A1 * | 6/2007 | Bargroff et al. ......... 455/12.1 |
| 2007/0143793 A1 * | 6/2007 | Barrett et al. ............ 725/44 |
| 2008/0163286 A1 | 7/2008 | Rudolph et al. | |

* cited by examiner

*Primary Examiner*—Duc Nguyen
*Assistant Examiner*—Hai V Nguyen
(74) *Attorney, Agent, or Firm*—Dorsey & Whitney LLP (57) ABSTRACT

A band translation method and device for selecting two or more desired frequency bands of data and bandstacking the two or more desired frequency bands of data into a single output.

9 Claims, 7 Drawing Sheets

METHOD AND DEVICE FOR BAND TRANSLATION

RELATED APPLICATIONS

This application claims the benefit of U.S. Provisional Application Ser. No. 60/575,579, filed May 28, 2004 and titled BAND TRANSLATION SWITCH, which application is hereby incorporated herein by reference in its entirety.

DETAILED DESCRIPTION

In this specification, embodiments of the present invention will be described using methods and systems related to subscriber satellite television service. This detailed description is not limited to any specific embodiment described herein. The present invention may also be applicable to cable television systems, broadcast television systems or other television systems. The present invention is also described in terms of digital video recorder (DVR) devices. The present invention may also be applicable to digital-versatile-disc (DVD) recording devices or other television recording devices. One skilled in the art will recognize that embodiments of the present invention can apply elsewhere. While the invention has been particularly shown and described with reference to embodiments thereof, it will be understood by those skilled in the art that various other changes in the form and details may be made therein without departing from the spirit and scope of the invention.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and DVR.

As a general matter, it should also be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CSPAN®, ABC®, CBS®, or ESPN®.

Finally, the term "channel," as used in this description, carries a different meaning from its normal connotation. The term "channel" is used herein to denote a particular carrier frequency or "sub-band" which can be tuned to by an appropriate tuner. In particular, note that "channel" does not refer to a single program/content service (e.g., CNN®, HBO®, CSPAN®). Similarly, "tuning" herein refers to receiving a channel (as previously defined) having multiple services thereon. A single satellite will typically have multiple transponders (e.g., 32 transponders) each one broadcasting a channel or band of approximately 24 to 27 MHz (0.024-0.027 GHz) in a broader frequency "band" of approximately 500 MHz. Thus a band of 0.5 GHz may contain numerous sub-bands or channels of roughly 24-27 MHz and each channel in turn may carry a combined stream of digital data comprising a number of content services.

Figure 1:
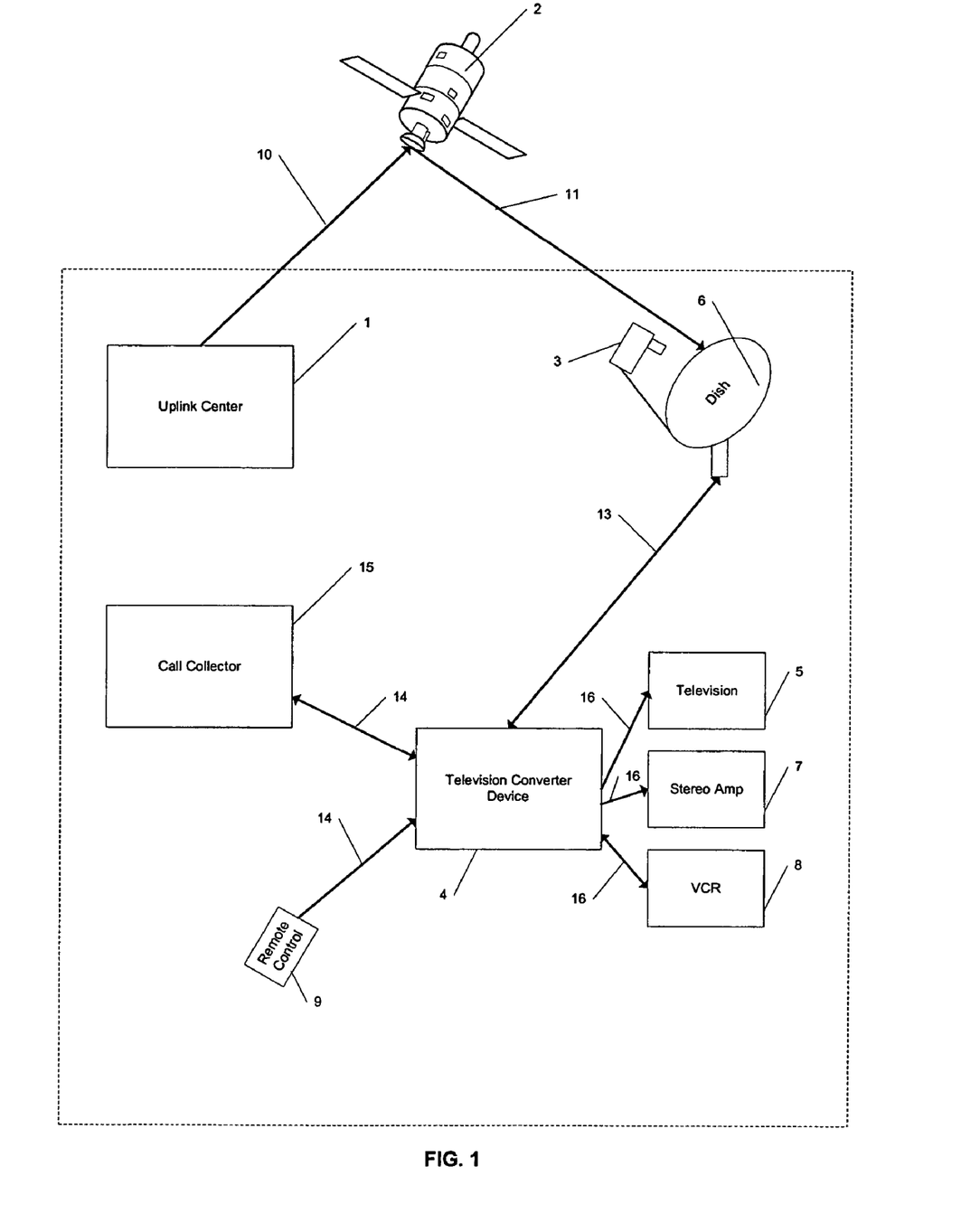
FIG. 1 illustrates a subscription satellite system in accordance with an embodiment of the present invention.

FIG. 1 illustrates a subscription satellite system in accordance with an embodiment of the present invention. The uplink center 1 of this embodiment transmits a combined stream of audio/video/data (herein more simply termed the "video stream") on the uplink channel 10 to satellite 2. It should be noted that video streams for a plurality of services (e.g., CNN®, HBO®, CSPAN®) may be multiplexed onto a single uplink channel 10. In typical direct broadcast satellite (DBS) systems it is not uncommon to have six or more video streams multiplexed onto a single radio frequency channel.

While transmissions to satellite 2 for purposes of satellite control may be made in another band such as the S-band (1.55-3 GHz), the uplink channel 10 used for the data uplink is most likely (but not necessarily) located within the broad K-band (10.9-36 GHz). Typically, the frequency range used is 17.3-17.8 GHz. DBS data streams are likely to be compressed in order to make maximum use of available bandwidth. More specifically, the MPEG-2 standard for video compression is typically used to encode the video stream into time-sequential data.

Satellite 2 may then translates the frequency of the signal for rebroadcast as a downlink channel 11. Satellite 2 may have a number of transponders, each having an assigned frequency sub-band that is typically used to downlink a transport stream. For the downlink, the frequency band of downlink channel 11 may be located within 12.2-12.7 GHZ. Downlink channel 11 creates footprint 12 on the surface of the planet. A footprint 12 is that area in which the downlink channel 11 may be received clearly using inexpensive devices such as dish 6. The dish 6 is typically a parabolic dish having a diameter of roughly 18 to 36 inches and a generally circular or elliptical planiform shape. While footprint 12 is depicted as a rectangular area in FIG. 1, footprint 12 is most likely to be a generally elliptical area many miles across. Dish 6 must be pointed properly if it is to receive the downlink signals. Mechanisms are available to assist in switching between satellites if more than one satellite feed is desired. Satellite 2 may broadcast multiple signals of differing polarity to dish 6, for example an LHCP signal (left hand circular polarity) and an RHCP signal (right hand circular polarity). Other polarities for broadcast signals are possible. As set forth in the present embodiment, many bands of RF data may be transmitted on a single 0.5 GHz bandwidth.

Low noise block converter 3 typically then takes the signals concentrated by dish 6, selects a polarity and translates the frequency of the signal to a lower frequency more suitable for transmission on coaxial cable 13 to television converter device 4. This lower frequency may, for example, be in the L-band (390 to 1550 MHz) or S-band (1.55 to 3.0 GHz). In this simplified embodiment, coaxial cable 13 may be the only connection between dish 6 and television converter device 4.

Television converter device 4 typically demodulates the signal, demultiplexes out the desired service, decodes it from MPEG-2 or other digital format, and reformats it into the appropriate analog or digital video specification (e.g., National Television Standards Committee (NTSC), Phase Alternate Lines (PAL), Advanced Television Standards Committee (ATSC) (also based upon MPEG-2 coding)). Television converter device 4 may then output the signal 16, as appropriate, to television 5, stereo amplifier 7, VCR 8 or other devices. Television converter device 4 may also interact with a call collector 15 via a modem, for example to report pay-per-view purchases, and may also interact with remote control 9 via UHF or IR signals 19. As explained below, television converter device 4 may perform other functions and be connected to fewer or more devices. One skilled in the art will recognize that many embodiments of television converter device 4 are possible and within the scope of this invention.

Figure 2:
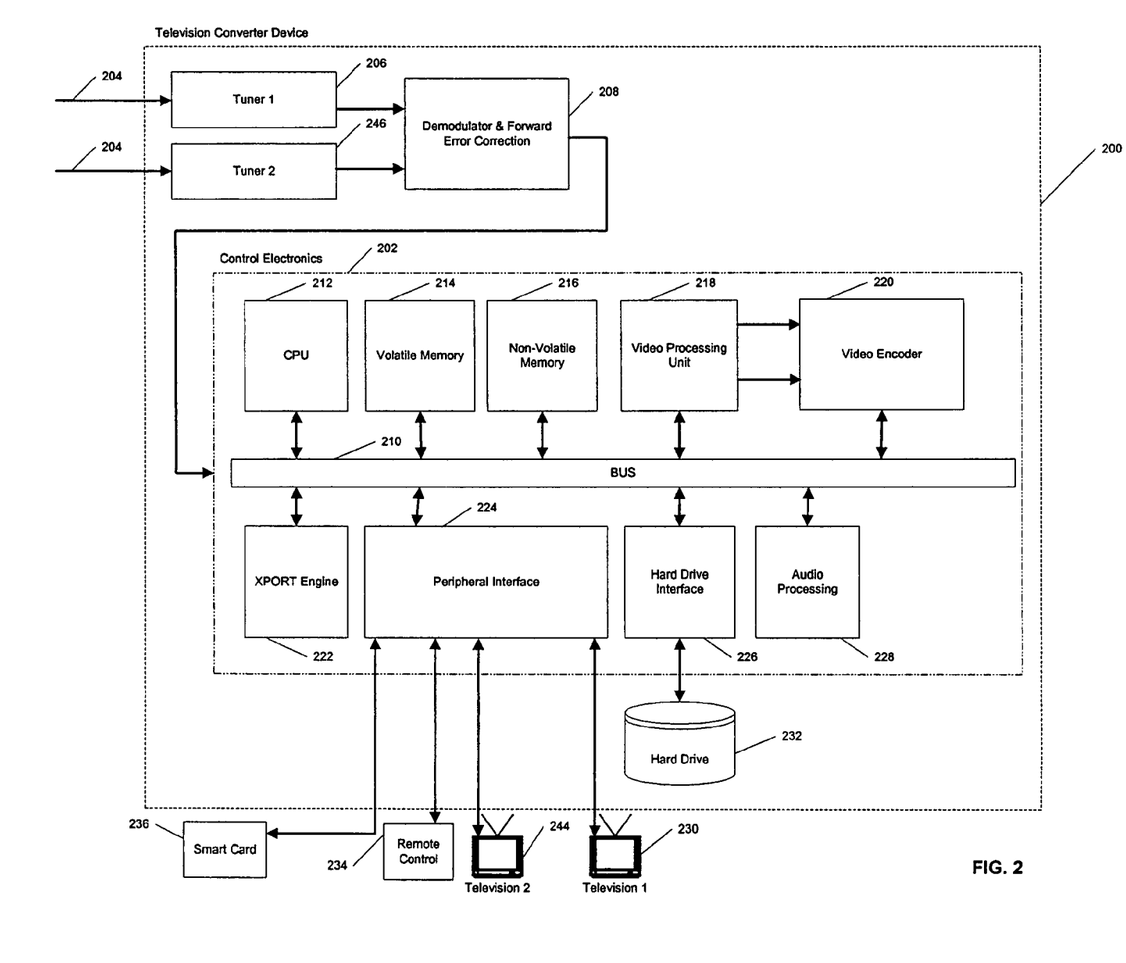
FIG. 2 is a functional block diagram of the logical elements of a television converter device in accordance with an embodiment of the present invention.

FIG. 2 provides a high level block diagram for the satellite television converter device 4, 200 with DVR functionality in accordance with an embodiment of the present invention.

The signal 13, 204 that arrives at the satellite STB 200 may undergo extensive processing. The television converter 200 may include one or more tuner devices 206, 246 that may receive a satellite signal 204. In one embodiment, tuner device 206, 246 may acquire one or more satellite signals 204 from satellite television distributor 1. As explained in this disclosure, each signal 204 may represent a distinct frequency band or source. For example, as more fully set forth by FIG. 5, tuner device 206 may receive the 950 MHz to 1450 MHz frequency band, while tuner device 246 may receive the 1650 MHz to 2150 MHz frequency band. Tuner devices 206, 246 may initially process the satellite signal 204. Tuner devices 206, 246 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite STB 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In one embodiment, control electronics unit 202 includes discrete electronic components combined into a single circuit with a shared bus 210. In other embodiments, control electronics unit 202 may be configured differently. For example, one or more of the control electronics unit 202 components in STB 200 may be combined or omitted. The control electronics unit 202 may use a custom ASIC, such as from the LSILogic G11 family, or FPGA, such as from the Altera Stratix™ family. As a further example, one or more of the control electronics unit 202 components in STB 200 may not share a bus 210, but may nonetheless be operatively connected by some other means. One skilled in the art will recognize that other configurations of STB 200 and control electronics unit 202 are possible and within the scope of this invention. One skilled in the art will further recognize that some components of STB 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. One embodiment of control electronics unit 202 contains a single CPU 212 that is operatively connected to the shared bus. In one embodiment, CPU 212 may be used, among other things, for logical operations for STB 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may contain one or more volatile memory components 214. Volatile memory components 214 may include, but are not limited to, one or more SDRAM memory chips. Similarly, control electronics unit 202 may also contain one or more non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within STB 200 and control electronics unit 202. One skilled in the art will recognize that memory 214, 216 may be used for many purposes, including, but not limited to, storing EPG data and storing data for use by CPU 212.

In the present embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG, MPEG2 or MPEG4 standards. Beyond the raw data, the separate digital data streams may include forward error correction, headers, checksums, or other information. All of this different information may be included in the digital television signal 204 processed by the satellite STB 4. Control electronics unit 202 may therefore include one or more video processing units 218 that, among other video processing operations, may decode encoded signal 204. In one embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. In one embodiment, video encoder 220 may translate digital stream into a signal using the NTSC, PAL or SECAM standards. One skilled in the art will recognize that video encoder unit 220 may include other functionality, may be integrated into other electronic components of satellite STB 200, and may encode digital stream 204 using other standards, including, but not limited to, MPEG and MPEG2.

Control electronics unit 202 may also include one or more storage interfaces or hard drive interfaces 226 and storage devices or hard drives 232. In one embodiment, television converter device 200 contains one hard drive interface 226 and hard drives 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite STB 200. In the embodiment of FIG. 2, the connection to the storage device 232 is shown to illustrate the capability of the STB 200 to store television programming as temporary and persistent recordings. In the embodiment the storage device 232 provides the long-term storage functionality of the STB (i.e. records and stores persistent recordings and may also include operating system software and other data or software necessary to the STB 200) and the short-term storage functionality (i.e. records and stores temporary recordings). The storage device 232 may include, for example, one or more devices, such as hard drives, as well as supporting hardware and software. In the embodiment of FIG. 2, all temporary and persistent recordings are located on the storage device 232. In the embodiment shown, the hard drive 232 comprises an 80 GB 'winchester' hard drive connected to the control electronics via a standard IDE/EIDE interface cable. As another example, hard drive 232 may be used to temporarily store data for processing by CPU 212. In this example, the hard drive 232 may allow the processor 212 to separate EPG data arriving as part of digital stream 204. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite STB 200. For example, an external hard drive 232 may be connected to satellite STB 200 using USB 2.0 or IEEE 1394 (FireWire) connections. Such an external hard drive may include a screen for portable viewing of programming stored on it. Furthermore, in embodiments of the present invention, the storage device 232 contains expansion slots, such as IDE connections, for the provision of additional storage devices to provide additional capacity at a later time. In addition, some embodiments include connections for external storage devices such as DVD-Rs that provide the capability of using the external devices as if they were an internal storage device. The design and operation of hard drives and similar devices are well known in the art and need not be described further here.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite STB 200 may be connected to one or more peripheral electronic devices through peripheral interface 224. These peripheral devices may include a stereo, television 230, smart card 236, VCR, or other devices. In one embodiment, satellite STB 200 is connected to two or more televisions 230, 244. Televisions 230, 244 may serve many purposes, including, but not limited to, displaying television programming, displaying one or more signals processed by one or more tuner devices 206, 246, displaying the EPG, displaying timer conflicts, and displaying other types of data, graphics and programming. Peripheral devices may receive and/or send signals from the satellite STB 200. For instance, the televisions 230, 244 may receive video and audio signals and a stereo may receive only audio signals. A camcorder, on the other hand, may send video or audio signals to the satellite STB 200 or receive audio and video signals from the STB to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The satellite STB 200 may also include connections to a remote control 9, 234 peripheral device, also sometimes referred to as a remote. The remote control 234 may be used to send commands to the satellite STB 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices, including, but not limited to, a television, stereo, VCR, or DVD player. The STB 200 may also be able to send signals to the remote control 234, including, but not limited to, signals to configure the remote control 234 to operate other peripheral devices. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite STB 200, one skilled in the art will recognize that other means of communicating with the STB 200 are available, including, but not limited to attached keyboards, front panel buttons or touch screens.

The satellite STB 200 may also include a remote control interface. A remote control interface may include any means for the user to communicate to the satellite STB 200, and may be implemented using the peripheral interface 224 of control electronics unit 202 or by connecting a peripheral remote control interface device. In one embodiment, a remote control interface may receive commands from one or more remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite STB 200 may include a phone line and modem. STB 200 may use a modem and phone line to communicate with one or more outside entities or systems (e.g., Call Collector 15). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite STB 200. For example, the phone line may communicate with the satellite STB 200 using an RJ-11 style telephone connection. One skilled in the art will recognize that there are many other uses for this phone line connection. For example, EPG data may be transmitted to STB 200 via phone line or in the satellite signal 204. One skilled in the art will recognize that the EPG data may be transmitted to STB 200 by various other methods, systems and outside entities. Also, one skilled in the art will recognize that a phone line connection to satellite distributor 1 may represent other communication connections, including, but not limited to, wireless, Internet, or microwave communications connections. Another function of the phone line may be to periodically receive the EPG data. One skilled in the art will also recognize that a phone line connection may permit networked communications with other network-ready devices using the telephone wiring within a subscriber's location.

A satellite STB 200 may also include network connectivity. For example, peripheral interface 224 may include components or interfaces that permit the connection of RJ-45 cabling and transmission of TCP/IP traffic to other connected devices. As another example, a wireless router may be attached via peripheral interface 224 to allow wireless local-area-network (WLAN) data communications using a standard wireless networking protocol such as WiMAX, 802.11b or 802.11g. One skilled in the art will recognize that various other network connections to the STB 200 are possible.

Figure 3:
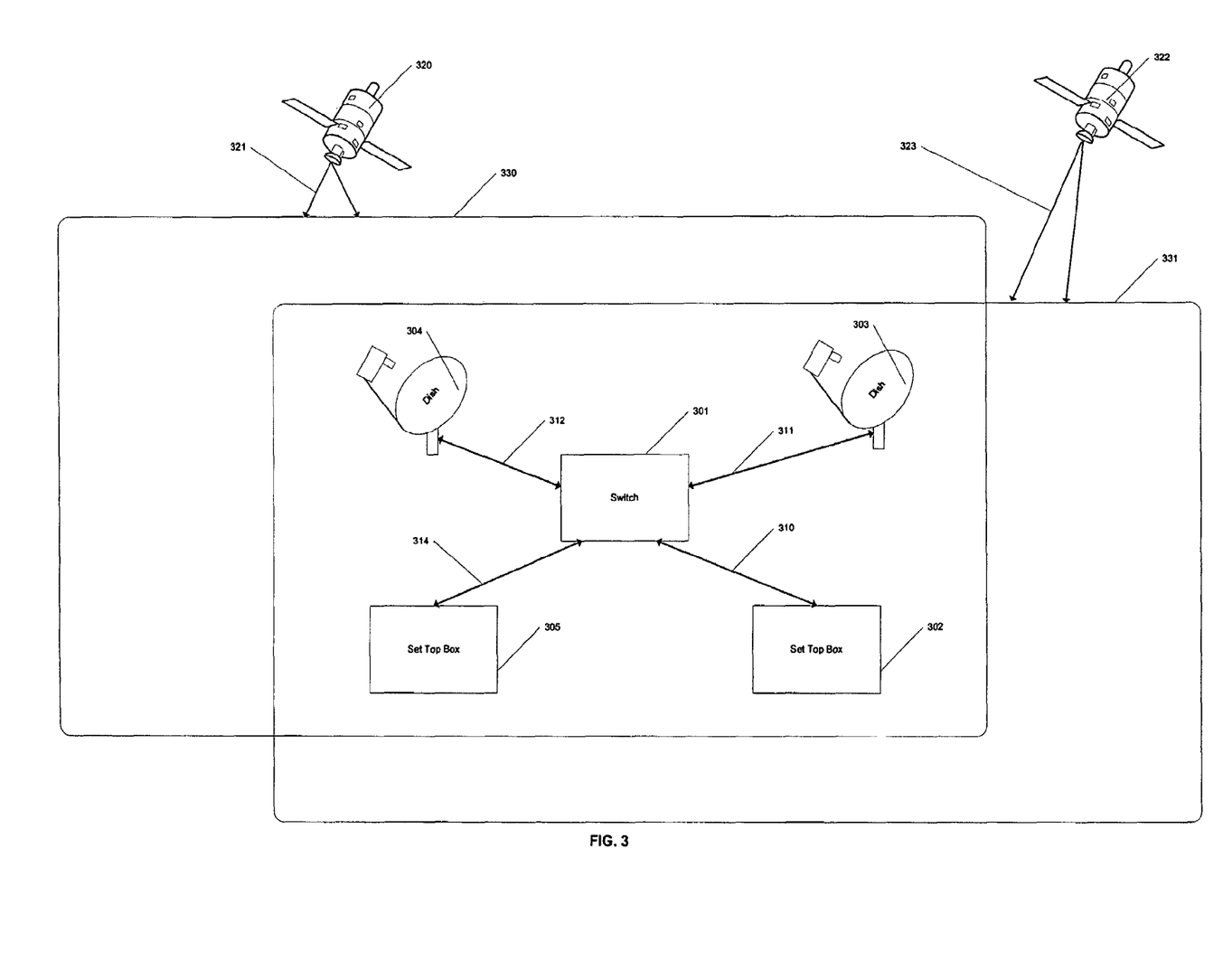
FIG. 3 is a block diagram of a multi-satellite subscription television system in accordance with an embodiment of the present invention.

FIG. 3 provides a block diagram of a multiple-satellite system employing single and double tuner television converter devices in accordance with an embodiment of the present invention. Satellites 320 and 322 broadcast transport streams 321 and 323 into overlapping footprints 330 and 331. Note that satellites 320 and 322 may broadcast on the same or overlapping frequencies if they are in different orbital slots. However, in an efficient system, satellites 320 and 322 will provide different or substantially different programming services. Dishes/LNBFs 303 and 304 are each pointed and electronically configured so as to receive broadcasts from one each of satellites 320 and 322. The same result can be achieved using a single dish/multi-LNBF (not shown) configured so as to receive in one dish the signals of two or more satellites: such systems are on the market, one example is the Dish 500 system, a product and registered trademark of the Echostar Technologies Corporation.

Switch 301, a source selection switch, is used by the television converter devices 302 and 305 to switch between dish/LNBFs 303 and 304. Each of dish/LNBFs 303 and 304 function as the source of one orbital position programming. The present invention is an improved switch allowing a single coaxial line (either 310 or 314) to simultaneously provide content/programming services selected from both dish 303 and 304. One skilled in the art will recognize that the invention is not limited to combining content/programming from only two satellites.

As discussed previously in relation to FIG. 1, satellite 2 will be sending an extremely wide bandwidth of data. Switch 301 and the tuner(s) in television converter device 200 (see FIG. 2) combine to select the appropriate transponder sub-band. Based upon DiSEqC 2.0 protocols received from the television converter device, for example, switch 301 will select the appropriate satellite and band/polarization having the desired programming content contained within it. One skilled in the art will recognize that other control methods are possible. This signal is sent to the appropriate tuner of the television converter device by means of the invention, and the tuner of the television converter device will select first the correct RF transponder sub-band and then the correct content service from among the services (typically 6-12) contained within the sub-band.

Figure 4:
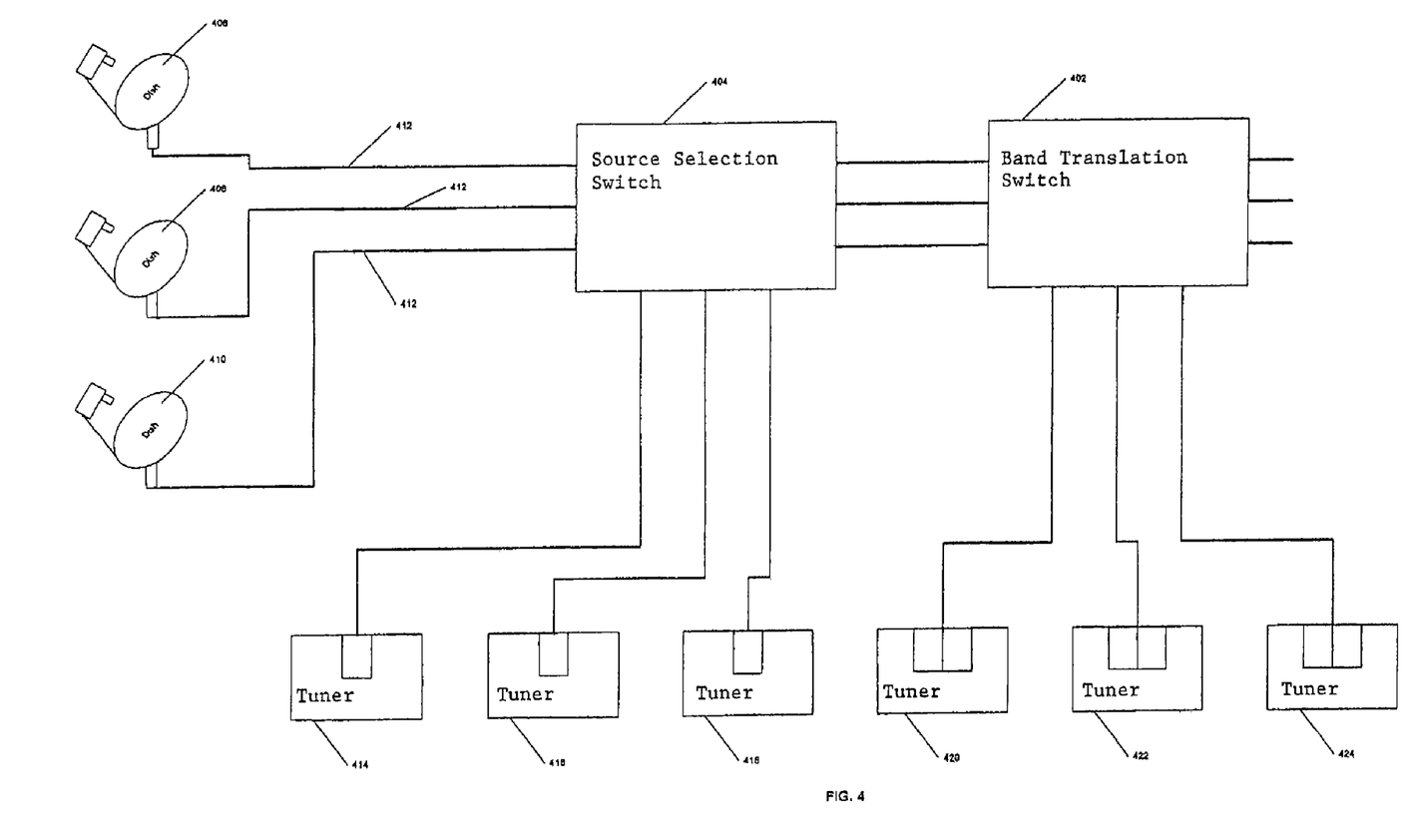
FIG. 4 is a block diagram of a multiple-satellite system employing single and double tuner television converter devices in accordance with an embodiment of the present invention.

FIG. 4, provides a block diagram of a multiple-satellite system employing single and double tuner television converter devices in accordance with an embodiment of the present invention. Signals from one or more satellites (not necessarily a minimum or maximum of three satellites) are received by satellite dishes 406, 408 and 410. Thus, each of satellite dishes 406, 408 and 410 functions as a source. For purposes of the appended claims, a source is defined to be a source of a plurality of frequency bands of RF data. Satellite dish 406 will use coaxial cable 412 to send the desired band (LHCP or RHCP) to ordinary source selection switch 404, other connections between other pairs of components are made by similar coaxial cables (not numbered). For purposes of this present invention, such coaxial cables are one type of operative connection; more broadly an operative connection is any device which connects two other devices so as to allow a desired frequency band to flow from the first device to the second device. In particular, in addition to coaxial cables and other types of data cables (e.g., microstrip circuitry, IEEE 1394, telephone wires, Ethernet and USB), certain types of devices including low and high pass filters may be operative connections within the meaning of the appended claims.

Ordinary source selection switch 404 is not able to process signals from more than one dish onto a single cable, so single tuner television converter devices 414, 416 and 418 receive only a single satellite transmission from switch 404. Even if switch 404 is able to bandstack signals from a single satellite, then multiple tuner television converter devices could be used in place of single tuner television converter devices 414, 416, and 418, thus offering PIP/multiple display capability from any two channels present on a single satellite, but not offering multiple satellite PIP/multiple display capability, as the present invention does. In this example, offering PIP/multiple display capability from any two channels present on a single satellite requires two separate cables from switch 404. Switch 404 also connects each dish signal to band translation switch 402, and potentially to devices such as other switches of either type thereafter.

Band translation switch 402, however, as an embodiment of the present invention, is able to select any two bands from any combinations of satellites and dishes and stack them according to commands from television converter devices 420, 422 and 424. Thus band translation switch may advantageously be used with double tuner television converter devices 420, 422 and 424. While television converter devices 420, 422 and 424 are portrayed as being dual/double tuner devices, the technique is obviously scalable with additional levels of bandstacking, more tuners per television converter device and so on.

As band translation switch 402 provides each tuner in multiple tuner television converter devices 420, 422 and 424 with a set frequency band (for example, 950 MHz to 1450 MHz) within which the television converter device can find the desired programming, control electronics 202 need not be reprogrammed to accept a new band each time the user changes service. This saves a great deal of processing and reset time on the part of the television converter device.

Figure 5:
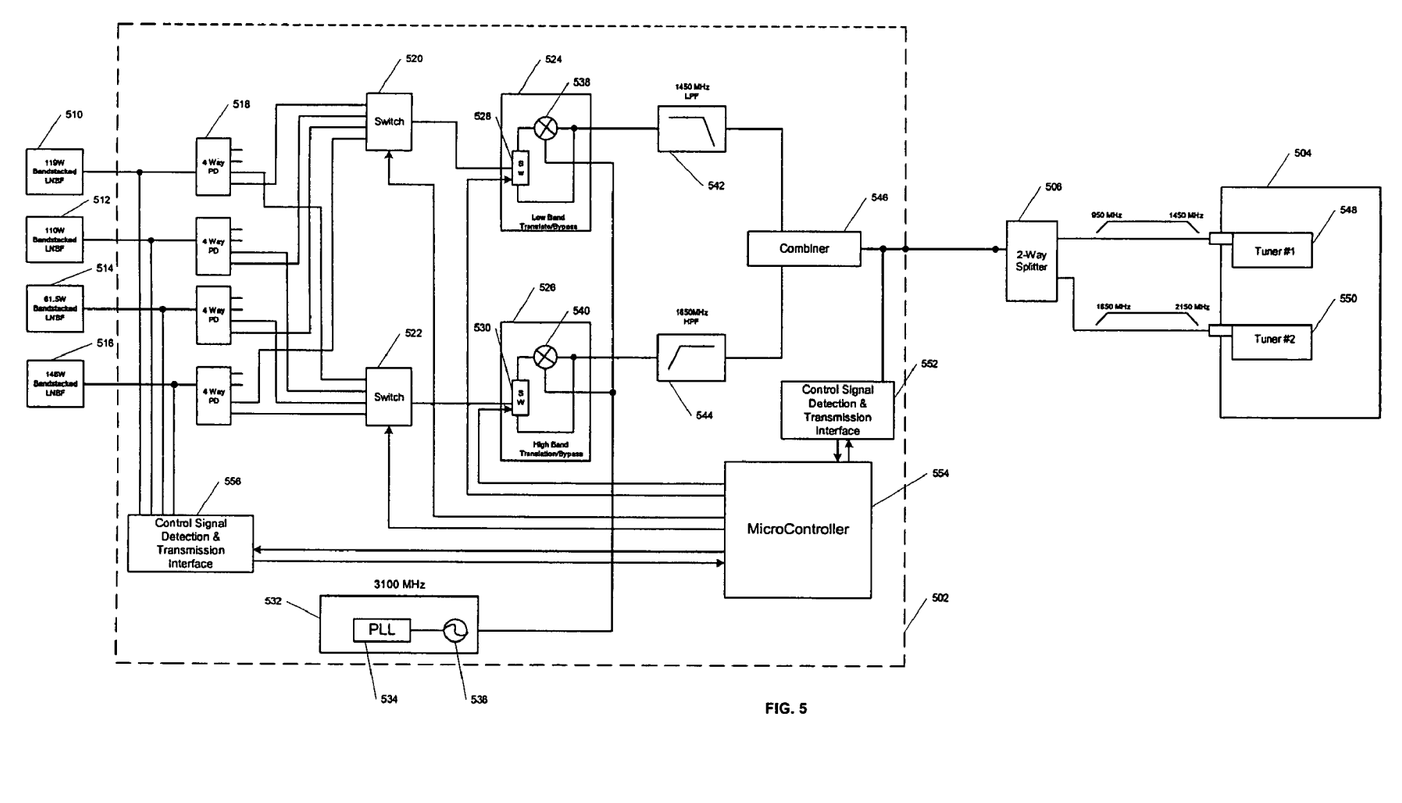
FIG. 5 is a block diagram of a multiple-satellite band translating system connected to a dual-tuner television converter device in accordance with an embodiment of the present invention.
Figure 6:
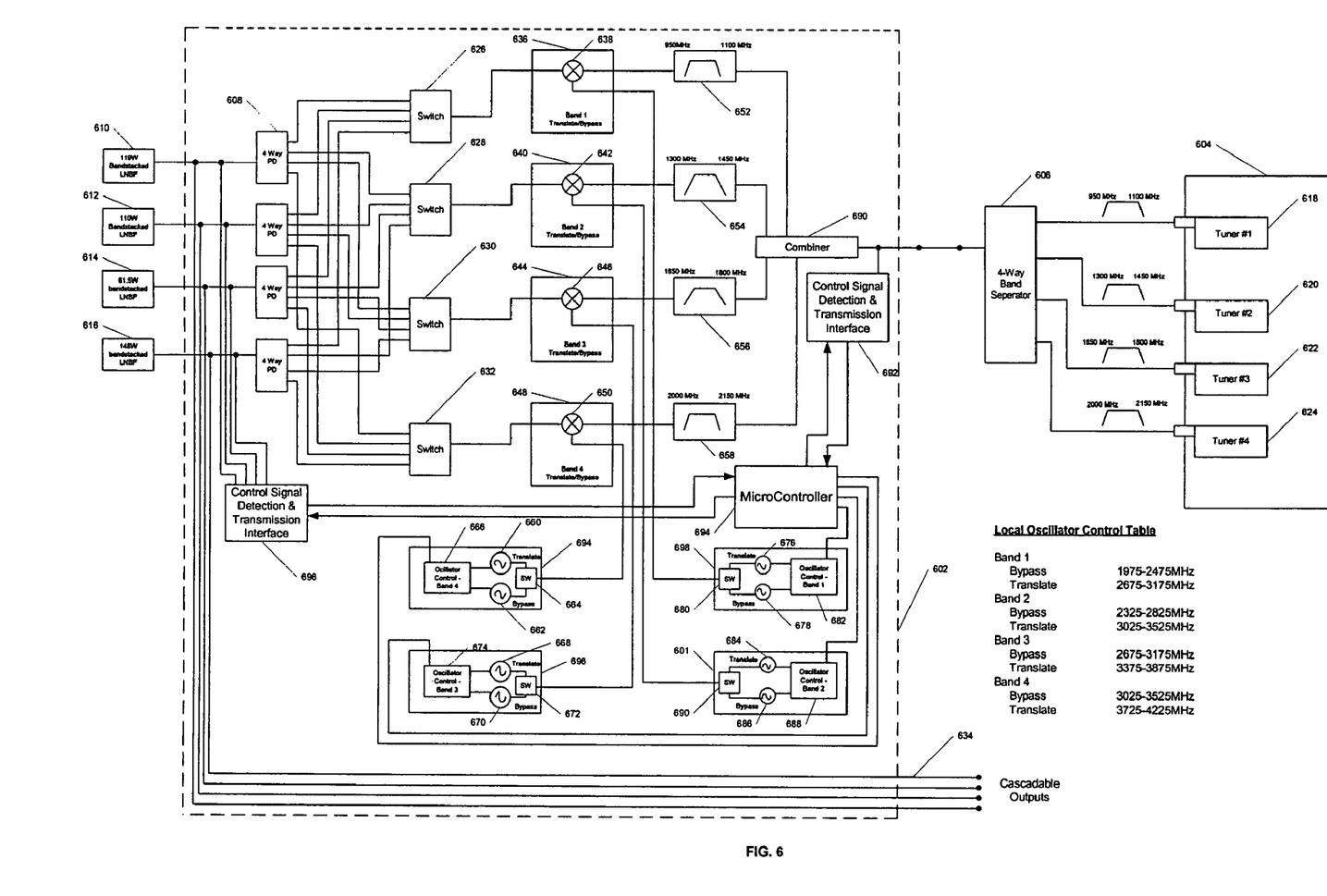
FIG. 6 is a block diagram of a multiple-satellite band translating system connected to a multiple-tuner television converter device in accordance with an embodiment of the present invention.

FIG. 5 presents a block diagram of a multiple-satellite band translating system connected to a dual-tuner television converter device in accordance with an embodiment of the present invention. FIG. 6 then presents a block diagram of a multiple-satellite band translating system connected to a multiple-tuner television converter device in accordance with another embodiment of the present invention. One skilled in the art will recognize that FIGS. 5 and 6 represent only two examples of the n-number of tuner configurations that are possible using band translation technology. One skilled in the art will also recognize that n-number of tuner configurations do not require an even number of tuners and that band translation for an odd number of tuners is also possible and within the scope of this invention. One skilled in the art will further recognize that the n-number of tuners may reside in devices (e.g., a personal computer) other than a television converter device in the form of a satellite STB.

Band translation switch 502 is connected to dual tuner television converter device 504 via separator 506. Cascade outputs 558 from band translation switch 502 allow band translation switch 502 to be connected with other band translation switches or conventional switches in a manner similar to the embodiment previously discussed with reference to FIG. 4.

Band translation switch 502 receives RF input from four satellite dishes 510, 512, 514 and 516. Band translation switch 502 might be connected to a lesser or greater number of such satellite dishes. In the embodiment shown in FIG. 5, each satellite dish points to a different satellite. Dish 510 points to a satellite located at 119 degrees west longitude, dish 512 points to a satellite located at 110 degrees west longitude, dish 514 to a satellite located at 61.5 degrees west longitude and dish 516 to a satellite located at 148 degrees west longitude. All four satellites in this particular embodiment are in geosynchronous orbit (zero degrees latitude, low or zero eccentricity and 40,000 kilometer orbital radius with no relative angular velocity relative to a point on the surface of the Earth), however, should DBS systems evolve to include the ability of satellite dishes to track moving satellites (for example, the Molniya system) the band translation switch 502 of the invention may still be used without alteration. The band translation switch 502 of the invention may also be used without alteration in other television systems or communication systems now known or later developed, as circumstances require.

The output from exemplary dish 510 is sent to power divider 518. In the embodiment depicted in FIG. 5, power divider 518 is a four way power divider, supporting a total of 4 tuners, for example, two television converter devices each having dual tuners. However, the power dividers of band translation switch 502 may be scaled from 4 outputs to 6, allowing switch 502 to support up to 6 tuners, such as would be present in a three dual-tuner television converter device system.

The outputs from the power dividers such as power divider 518 are sent to source selection switches 520 and 522. In one embodiment, two additional source selection switches (not pictured) are also present in band translation switch 502. Every source selection switch receives the signals from every satellite dish 510, 512, 514, and 516, in this embodiment. Note that since the signals received are polarized (left-hand, right-hand, vertical, horizontal or other polarization), each dish is actually bandstacking and sending to the source selection switches 520, 522 two pre-stacked bands of data. Thus in this embodiment source selection switch 520, for example, may be receiving up to eight 0.5 GHz wide bands of data (two bands per satellite dish) but will be selecting the output from one satellite only (2 bands of data) for transmission to the next stage of processing.

The output from source selection switch 520 goes to low band translator 524. LBT 524 includes signal path signal path switch 528 allowing bypass of the low band translation function, depending upon which band of the two pre-stacked bands received from switch 520 is the desirable band. If translation is desired, signal path switch 528 causes band translation at frequency mixer 538. If translation of the frequency bands is not desired, signal path switch 528 will bypass frequency mixer 538 and the translation function will not occur.

Translation is accomplished in frequency mixer 538 by summation-difference with a 3.1 GHz signal obtained from clock/frequency generator 532: a phase locked loop 534 and an oscillator 536. The translated or bypassed band is then passed through low pass filter 542. LPF 542 ensures that the signal sent from low band translator 524 is cut off beginning at approximately 1450 MHz. In present embodiment, the operative connection from low band translator 524 to frequency stacker 546 is by way of LPF 542, with such circuitry, wiring or cables as is in turn required between these components, however, in other embodiments the operative connection may be only circuitry, wiring, coaxial cable or other cabling.

In a like manner, the output from satellite selector switch 522 is sent to high band translator 526. Switch 530 either sends the signal to frequency mixer 540 (once again driven by local oscillator 536) or bypasses the high band translation step. The output from high band lo translator 526 is sent to high pass filter 544 which cuts off frequencies below approximately 1650 MHz.

Note that signal path switches 528 and 530 thus have at least two positions: first positions in which signal path switches 528 and 530 are in the circuit and second positions in which signal path switches 528 and 530 cause the band translators 524 and 526 to be bypassed, in which case the band translators 524 and 526 are said to be out of the circuit.

The two signals are combined after LPF 542 and HPF 544 in frequency stacker 546, then sent to separator 506. Tuner 548 is programmed to accept frequencies from 950 MHz to 1450 MHz while tuner 550 is programmed to accept frequencies from 1650 MHz to 2150 MHz, effectively redividing the signal on that basis. The 0.2 GHz bandwidth between 1450 MHz and 1650 MHz is referred to as a "guard band" and usually contains the quickly degrading frequencies cut off by LPF 542 and HPF 544: these cut off frequencies may drop by many dB before crossing the guard bandwidth, at which reduced level they do not significantly impact the signal being read by the other tuner.

In operation, tuners 548 and 550 will signal to band translation switch 502 which satellite and polarity on which may be found the desired service for each tuner. Source selection switches 520 and 522 will each select the proper satellite dish, which may be the same or a different dish. Each satellite switch 520, 522 will pass both bands from the selected satellite (pre-stacked from the different polarity signals sent on the same frequency to the dishes) to the band translators 524, 526. Low band translator 524 will determine if the signal to be sent to tuner 548 is already in the lower (950-1450 MHz) band and if so, it will bypass translation and simply send the signal to LPF 542, which will filter out the higher frequency band. However if the signal is in the higher frequency band of 1650-2150 MHz, then signal path switch 528 will send the signal to frequency mixer 538 to down-convert the frequency of the desired signal to the lower band. (Note that in this event, the undesired lower frequency signal will have its frequency reduced from the lower band to an even lower frequency range (sub 950 MHz), below what tuner 548 recognizes.)

High band translator 526 will carry out the converse process: it will determine if the signal to be sent to tuner 550 is already in the higher band and if so, will bypass high band translation and simply send the signal to HPF 544. On the other hand, if the signal which is desired by tuner 550 (programmed to accept the higher frequency band) is in the lower frequency band, then switch 530 will send the signal to frequency mixer 540 to up-convert the frequency of the desired signal to the higher range. In this case, the higher of the two bands sent to HBT 526 will be translated to a value above the highest frequency (2.15 GHz) which tuner 550 cannot recognize.

The result is that either tuner may request any frequency band from any satellite and yet receive it in the frequency range for which that tuner has already been programmed, thus eliminating the need for television converter device 504 to accept frequency bands as they arrived from the satellite dishes.

While only one television converter device 504 is shown, band translation switch 502 equipped with 4 way power dividers 518, for example, that can support two entirely independent dual tuner television converter devices via additional source selection switches, LBT, LPF, HBT, HPF and a frequency stacker. As stated earlier, by means of 6 way power dividers, three dual tuner television converter devices could be supported. One skilled in the art will recognize that several n-tuner configurations are possible.

Note that LPF 542, HPF 544 and frequency stacker 546 effectively amount to a diplexer. However, band translation switch 502 may have additional circuitry (intermediate band translators, intermediate bandpass filters, etc.) so as to function as a multiplexer; that is, to stack more than two bands into the output frequencies. Such a configuration might require tuners having additional spectrum recognition abilities and/or constraints on the use of coaxial cable (which might have shorter allowable runs, additional features to increase bandwidth or may be replaced with other forms of connection) but would not exceed the scope of the invention as claimed herein. In such a system, as is evident from FIG. 6, band translation switch 502 may support more than two tuners in a single television converter device on a single coaxial cable. For example, a first frequency band and a second frequency band of a single coaxial cable may be sub-divided so as to contain two frequency bands in each of the first and second frequency bands. In this example, four tuners in a single television converter device may then receive the four output frequency bands. One skilled in the art will recognize that band translation switch 502 may also be reconfigured to support multiple-tuner television converter device configurations.

In operation, it is possible that the two bands stacked for transmission to the dual tuner television converter device might come from different satellites or the same satellites, or might even be the same band, bandstacked onto itself. The original frequencies of the two bands may even become reversed in the band translation switch. In any embodiment, however, each tuner can receive its desired band in the frequency band it is pre-programmed to receive. Each tuner then performs RF tuning to the appropriate sub-band/channel, demodulating and demultiplexing; and digitally processing the chosen program service from among those program services on the channel.

The control system of switch 502 is also depicted. In operation, control signal detection and transmission interface 552 will detect control signals sent by tuners 548 and 550 and cooperate with microcontroller 554. In the present two-tuner embodiment, the control signals sent by tuners 548 and 550 will be designated as master and slave. For example, a master or primary control signal may be sent by tuner 548, while a slave or secondary signal is sent by tuner 550. Designation of control signals as master and slave may reduce the processing time of the control signal detection and transmission interface 552 and microcontroller 554. In another embodiment, the control signals sent by tuners 548 and 550 may operate independently. Microcontroller 554 has control authority over signal path switches 528 and 530, satellite selection switches 520 and 522 and control signal detection and transmission interface 556. Interface 556 may be a second control signal detection and transmission interface separate from interface 552, or in alternative embodiments the two structures may be combined. For example, the mere presence or absence of a signal may be used, respectively, to indicate a master or slave primary control signal.

In operation, signals sent from tuners 548 and 550 are used by microcontroller 554 to control the satellite selection switches 520 and 522; by this structure the appropriate satellite signals are sent to LBT 524 and HBT 526. Microcontroller 554 also controls signal path switches 528 and 530 independently from each other in order to determine whether band translation occurs in each translator; as a result of this, the band requested by tuners 548, 550, arrives at the tuner in the correct frequency band. In addition to signals sent from tuners 548, 550 to microcontroller 554, other signals are sent from tuners 548, 550 having preambles which indicate that they are to be passed through to the LNBF at the satellite dish.

As set forth earlier, FIG. 6 a block diagram of a multiple-satellite band translating system connected to a multiple-tuner television converter device in accordance with an embodiment of the present invention.

Band translation switch 602 is connected to a four tuner television converter device 604 via separator 606. Cascade outputs 634 from band translation switch 602 allow band translation switch-602 to be connected with other band translation switches or conventional switches in a manner similar to the embodiment previously discussed with reference to FIG. 5.

Band translation switch 602 receives RF input from four satellite dishes 610, 612, 614 and 616. Band translation switch 602 might be connected to a lesser or greater number of such satellite dishes. In the embodiment shown in FIG. 6, each satellite dish points to a different satellite. Dish 610 points to a satellite located at 119 degrees west longitude, dish 612 points to a satellite located at 110 degrees west longitude, dish 614 to a satellite located at 61.5 degrees west longitude and dish 616 to a satellite located at 148 degrees west longitude. All four satellites in this particular embodiment are in geosynchronous orbit (zero degrees latitude, low or zero eccentricity and 40,000 kilometer orbital radius with no relative angular velocity relative to a point on the surface of the Earth), however, should DBS systems evolve to include the ability of satellite dishes to track moving satellites (for example, the Molniya system) the band translation switch 602 of the invention may still be used without alteration. The band translation switch 902 of the invention may also be used without alteration in other television systems or communication systems now known or later developed, as circumstances require.

The output from exemplary dish 610 is sent to power divider 608. In the embodiment depicted in FIG. 6, power divider 608 is a four way power divider and supports a total of 4 tuners in a single television converter device. One skilled in the art will recognize, however, that n-number of tuners is possible and that placement of the n-number of tuners need not occur in the same television converter device. For example, two television converter devices may each have dual tuners. Likewise, the power dividers of band translation switch 602 may also be scaled from 4 outputs to 6, allowing switch 602 to support up to 6 tuners, such as would be present in a three dual-tuner television converter device system.

The outputs from the power dividers such as power divider 608 are sent to source selection switches 626, 628, 630, and 632. Every source selection switch receives the signals from every satellite dish 610, 612, 614, and 616, in this embodiment. Note that since the signals received are polarized (left-hand, right-hand, vertical, horizontal or other polarization), each dish is actually bandstacking and sending to the source selection switches 626, 628, 630, and 632 four pre-stacked bands of data or a bank of independent polarization bands. Thus in this embodiment source selection switch 626, for example, may be receiving up to eight 0.5 GHz wide bands of data (two bands per satellite dish) but will be selecting the output from one satellite only (2 bands of data) for transmission to the next stage of processing.

The output from source selection switch 626 goes to low band translator (LBT) 636. LBT 636 includes frequency mixer 638. Band translation is accomplished in frequency mixer 638 by summation-difference with a 3.1 GHz signal obtained from low band oscillator unit (LBOU) 698: a local oscillator path switch 680, a phase locked translation oscillator 676, a phase locked bypass oscillator 678 and an oscillator control 682. Local oscillator path switch 680 allows bypass of the band translation function depending upon the desired band set forth by the oscillator control 682. If translation is desired by the oscillator control 682, phase locked translation oscillator 676 translates the signal at a frequency of approximately 2675 MHz to 3175 MHz and returns the signal to frequency mixer 638. If translation is not desired by the oscillator control 682, phase locked bypass oscillator 678 bypasses the signal at a frequency of approximately 1975 MHz to 2475 MHz and returns the signal to frequency mixer 638 without band translation of the signal. One skilled in the art will recognize that other band translation and bypass structures are possible within the LBOU. Further, one skilled in the art will recognize that several other translation and bypass signal oscillation frequencies are possible and within the scope of this invention. The translated or bypassed band is then passed through low pass filter (LPF) 652. LPF 652 ensures that the signal sent from low band translator 636 is cut off at frequencies below approximately 950 MHz and above 1100 MHz.

In a like manner, the output from satellite selector switch 928 is sent to a second band translator (SBT) 640. SBT 640 includes frequency mixer 642. Band translation is accomplished in frequency mixer 642 by summation-difference with a 3.1 GHz signal obtained from low mid-range band oscillator unit (LMBOU) 601: a local oscillator path switch 690, a phase locked translation oscillator 684, a phase locked bypass oscillator 686 and an oscillator control 688. Local oscillator path switch 690 allows bypass of the band translation function depending upon the desired band set forth by the oscillator control 688. If translation is desired by the oscillator control 688, phase locked translation oscillator 684 translates the signal at a frequency of approximately 3025 MHz to 3525 MHz and returns the signal to frequency mixer 642. If translation is not desired by the oscillator control 688, phase locked bypass oscillator 686 bypasses the signal at a frequency of approximately 2325 MHz to 2825 MHz and returns the signal to frequency mixer 642 without band translation of the signal. One skilled in the art will recognize that other band translation and bypass structures are possible within the LMBOU. Further, one skilled in the art will recognize that several other translation and bypass signal oscillation frequencies are possible and within the scope of this invention. The translated or bypassed band is then passed through low mid-range pass filter (LMPF) 654. LMPF 654 ensures that the signal sent from SBT 640 is cut off at frequencies below approximately 1300 MHz and above 1450 MHz.

Similarly, the output from satellite selector switch 930 is sent to a third band translator (TBT) 644. TBT 644 includes frequency mixer 646. Band translation is accomplished in frequency mixer 646 by summation-difference with a 3.1 GHz signal obtained from high mid-range band oscillator unit (HMBOU) 696: a local oscillator path switch 672, a phase locked translation oscillator 668, a phase locked bypass oscillator 670 and an oscillator control 674. Local oscillator path switch 672 allows bypass of the band translation function depending upon the desired band set forth by the oscillator control 674. If translation is desired by the oscillator control 674, phase locked translation oscillator 668 translates the signal at a frequency of approximately 3375 MHz to 3875 MHz and returns the signal to frequency mixer 646. If translation is not desired by the oscillator control 674, phase locked bypass oscillator 670 bypasses the signal at a frequency of approximately 2675 MHz to 3175 MHz and returns the signal to frequency mixer 646 without band translation of the signal. One skilled in the art will recognize that other band translation and bypass structures are possible within the HMBOU. Further, one skilled in the art will recognize that several other translation and bypass signal oscillation frequencies are possible and within the scope of this invention. The translated or bypassed band is then passed through high mid-range pass filter (HMPF) 656. HMPF 656 ensures that the signal sent from TBT 644 is cut off at frequencies below approximately 1650 MHz and above 1800 MHz.

Finally, to describe the last translator of this embodiment, the output from satellite selector switch 632 is sent to a high band translator (HBT) 648. HBT 648 includes frequency mixer 650. Band translation is accomplished in frequency mixer 650 by summation-difference with a 3.1 GHz signal obtained from high band oscillator unit (HBOU) 694: a local oscillator path switch 664, a phase locked translation oscillator 660, a phase locked bypass oscillator 662 and an oscillator control 666. Local oscillator path switch 664 allows bypass of the band translation function depending upon the desired band set forth by the oscillator control 666. If translation is desired by the oscillator control 666, phase locked translation oscillator 660 translates the signal at a frequency of approximately 3725 MHz to 4225 MHz and returns the signal to frequency mixer 650. If translation is not desired by the oscillator control 666, phase locked bypass oscillator 662 bypasses the signal at a frequency of approximately 3025 MHz to 3525 MHz and returns the signal to frequency mixer 650 without band translation of the signal. One skilled in the art will recognize that other band translation and bypass structures are possible within the HBOU. Further, one skilled in the art will recognize that several other translation and bypass signal oscillation frequencies are possible and within the scope of this invention. The translated or bypassed band is then passed through high pass filter (HPF) 658. HPF 658 ensures that the signal sent from HBT 648 is cut off at frequencies below approximately 2000 MHz and above 2150 MHz.

In the present embodiment, the operative connection from band translators 636, 640, 644 and 648 to frequency stacker 690 is by way of LPF 652, LMPF 654, HMPF 656 and HPF 658, with such circuitry, wiring or cables as are in turn required between these components, however, in other embodiments the operative connection may be only circuitry, wiring, coaxial cable or other cabling.

The four signals are combined from LPF 652, LMPF 654, HMPF 656 and HPF 658 in frequency stacker 690; the combined signal then is sent to splitter 606. Tuner 618 is programmed to accept frequencies from 950 MHz to 1100 MHz, tuner 620 is programmed to accept frequencies from 1300 MHz to 1450 MHz, tuner 622 is programmed to accept frequencies from 1650 MHz to 1800 MHz and tuner 624 is programmed to accept frequencies from 2000 MHz to 2150 MHz. Each tuner 618, 620, 622, and 624 effectively redivides the signal by these frequency programming ranges. The 0.2 GHz bandwidth between 1450 MHz and 1650 MHz, for example, is referred to as a "guard band" and usually contains the quickly degrading frequencies cut off by LMPF 654 and HMPF 656: these cut off frequencies may drop by many dB before crossing the guard bandwidth, at which reduced level they do not significantly impact the signal being read by the other tuner.

In operation, tuners 618, 620, 622 and 624 will signal to band translation switch 602 which satellite and polarity on which may be found the desired service for each tuner. Source selection switches 626, 628, 630 and 632 will each select the proper satellite dish, which may be the same or a different dish. Each satellite switch 626, 628, 630 and 632 will pass both bands from the selected satellite (pre-stacked from the different polarity signals sent on the same frequency to the dishes) to the band translators 636, 640, 644, and 648.

LBT 936 will determine if the signal to be sent to tuner 618 is already in the lower (950-1100 MHz) band and if so, it will bypass translation and simply send the signal to LPF 652, which will filter out the other frequency bands. However if the signal is in a higher frequency band of 1300-1450 MHz, for example, then frequency mixer 638 will down-convert the frequency of the desired signal to the appropriate lower band. Note that in this event, the undesired lower frequency signal will have its frequency reduced from the lower band to an even lower frequency range (sub 950 MHz), below what tuner 618 recognizes.

SBT 640 will determine if the signal to be sent to tuner 620 is already in the lower mid-range (1300-1450 MHz) band and if so, it will bypass translation and simply send the signal to LMPF 654, which will filter out the other frequency bands. However if the signal is in the higher frequency band of 1650-1800 MHz, for example, then frequency mixer 642 will down-convert the frequency of the desired signal to the appropriate lower band. Note that in this event, the undesired lower frequency signal will have its frequency reduced from the lower band to an even lower frequency range (sub 1300 MHz), below what tuner 620 recognizes.

TBT 644 will determine if the signal to be sent to tuner 622 is already in the higher mid-range (1650-1800 MHz) band and if so, it will bypass translation and simply send the signal to HMPF 656, which will filter out the other frequency bands. However if the signal is in the higher frequency band of 2000-2150 MHz, for example, then frequency mixer 646 to down-convert the frequency of the desired signal to the appropriate lower band. Note that in this event, the undesired lower frequency signal will have its frequency reduced from the lower band to an even lower frequency range (sub 1650 MHz), below what tuner 622 recognizes.

HBT 648 will carry out the converse process: it will determine if the signal to be sent to tuner 624 is already in the higher band and if so, will bypass high band translation and simply send the signal to HPF 658. On the other hand, if the signal which is desired by tuner 624 (programmed to accept the higher frequency band) is in a lower frequency band, then frequency mixer 650 will up-convert the frequency of the desired signal to the higher range. In this case, the higher of the four bands sent to HBT 648 will be translated to a value above the highest frequency (2.15 GHz) which tuner 624 cannot recognize.

The result of the embodiment described above is that either tuner may request any frequency band from any satellite and yet receive it in the frequency range for which that tuner has already been programmed, thus eliminating the need for television converter device 604 to accept frequency bands as they arrived from the satellite dishes.

Note that LPF 652, LMPF 654, HMPF 656, HPF 658 and frequency stacker 690 effectively amount to a multiplexer; that is, more than two bands are stacked into multiple output frequencies. A person skilled in the art would recognize that this multiplexer configuration typically requires tuners to have additional spectrum recognition abilities and/or constraints on the use of coaxial cable (which may have shorter allowable runs, additional features to increase bandwidth or may be replaced with other forms of connection) that are within the scope of the invention as claimed herein. In such a system, as is evident from FIGS. 5 and 6, a band translation switch may support more than two tuners in a single television converter device on a single coaxial cable. As is also evident from the drawings, band translation switches may also be reconfigured so as to support one or more single tuner television converter devices from a single coaxial cable carrying a signal from one or more satellite dishes.

The control system of switch 602 is also depicted. In operation, control signal detection and transmission interface 692 will detect control signals sent by tuners 618, 620, 622 and 624 and cooperate with microcontroller 694. In this embodiment, the control signals sent by tuners 618, 620, 622 and 624 operate independently. One skilled in the art will recognize that several control signaling paradigms are possible and within the scope of this invention. Microcontroller 694 has control authority over band translation oscillator control 666, 674, 682, 688 and control signal detection and transmission interface 696. Interface 696 may be a second control signal detection and transmission interface separate from interface 692, or in alternative embodiments the two structures may be combined.

In operation, signals sent from tuners 618, 620, 622 and 624 are used by microcontroller 694 to control the band translation oscillators 660, 668, 676, 684 and bypass oscillators 662, 670, 678, 686; by this structure the appropriate satellite signals are sent to LBT 636, SBT 640, TBT 644 and HBT 648. In addition to signals sent from tuners 618, 620, 622 and 624 to microcontroller 694, other signals are sent from tuners 618, 620, 622 and 624 having preambles which indicate that they are to be passed through to the LNBF at the satellite dish.

In band translation switches 402, 502, 602 and 301 at least two switching protocols may be used: proprietary 13/18 switching and the DiSEqC 2.0 protocol. In the former technique, television converter devices send proprietary commands to the band translation switch by varying the length and pattern of the 13 volt or 18 volt potential. Based on the commands sent, the band translation switch selects the appropriate signal to send back to the sending television converter devices. Referring once again to FIG. 3, the 13/18 polarity may be passed directly by switch 301 to dish/LNBFs 303, 304, or switch 301 may maintain constant polarity. In one embodiment presently contemplated for carrying out the invention, the DiSEqC 2.0 protocol is used. The DiSEqC 2.0 protocol, unlike the 13/18 polarity method, allows for bi-directional communication among the five components of the switching system. Television converter devices 302 and 305 provide the current to operate switch 301 and the LNBFs located at dish/LNBFs 303 and 304. In other embodiments, switch 301 may be integrated with, included within or housed inside of an LNBF. Under either protocol, television converter devices 302 and 305 are capable of independent operation in which the activities of one box do not effect the activities of the other. Under either protocol, tuners 548, 550, 618, 620, 622, and 624 are capable of independent operation in which the activities and band selected by one tuner do not effect the activities of the other.

Figure 7:
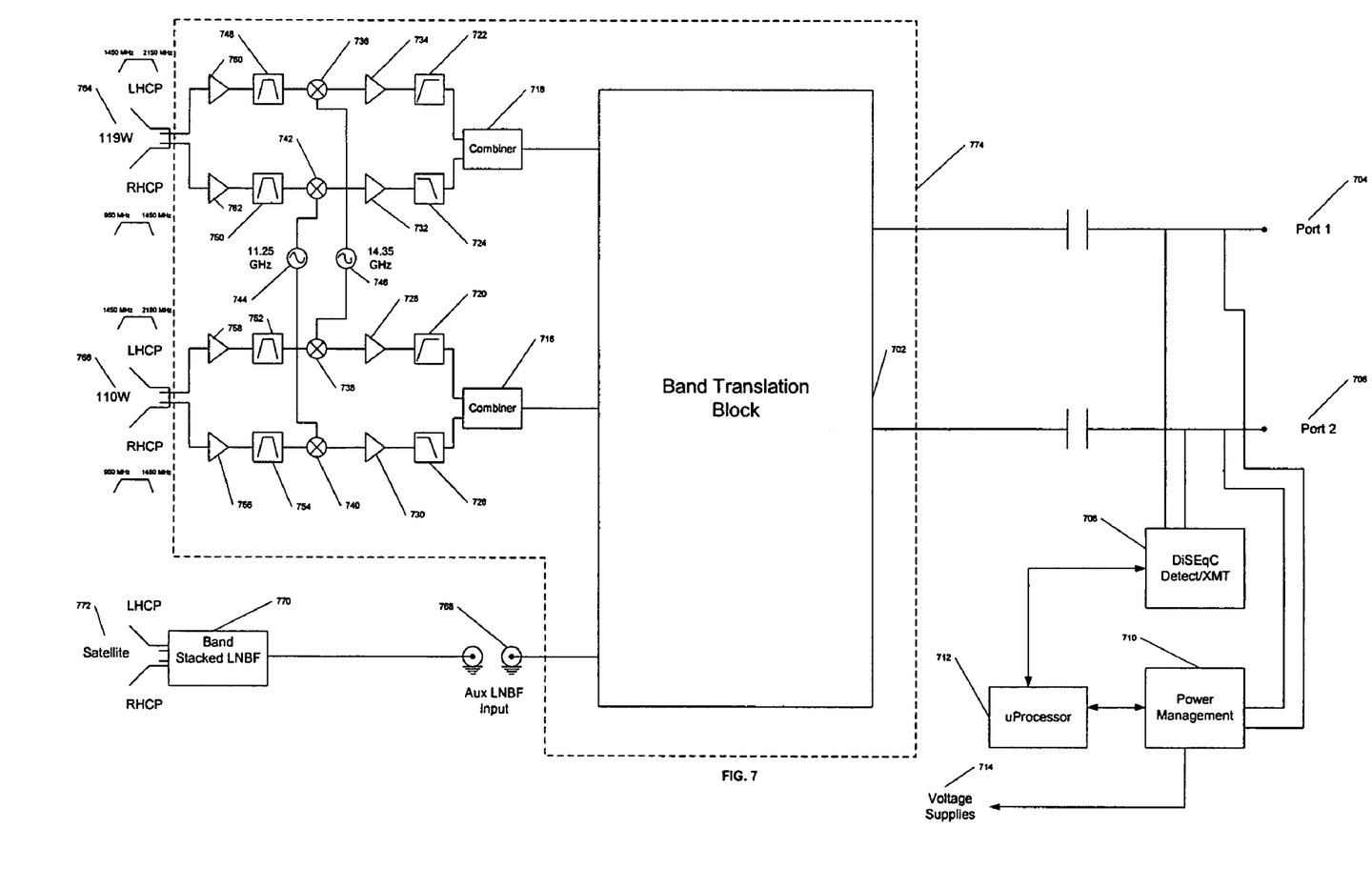
FIG. 7 is a block diagram of a low noise block converter embodiment employing the band translating system in accordance with an embodiment of the present invention.

FIG. 7 depicts a band-stacked low-noise block converter (LNB) embodiment of the method for band translation. In this embodiment, LNB 774 is connected to band translation block 702 and satellites 764, 766 that receive, respectively, signals from satellites located at 119 degrees west longitude and 110 degrees west longitude. Dish 764 receives signals that are left-hand circular polarized (LHCP) in the frequency band range of 1650 MHz to 2150 MHz and right-hand circular polarized (RHCP) in the frequency band range of 950 MHz to 1450 MHz. Likewise, dish 766 also receives signals that are left-hand circular polarize (LHCP) in the frequency band range of 1650 MHz to 2150 MHz and right-hand circular polarized (RHCP) in the frequency band range of 950 MHz to 1450 MHz. Alternatively, in another embodiment, Dish 764 may receive signal polarity bands that are not stacked and that comprise a single satellite signal. One skilled in the art will recognize that several satellite orbital locations and radio frequency bands are possible and also within the scope of this invention. LNB 774 is optionally connected via Aux LNBF Input 768 to a band-stacked LNB 770 input.

LNB 774 may include circuitry to maintain signal bands, including amplifiers 760, 762, 734, 732, 758, 756, 728, 730. One skilled in the art will recognize that other signal processing circuitry is possible within the LNB and within the scope of this invention. LNB 774 also includes signal frequency mixers 736 and 738 that are connected via local signal oscillator 746. Local signal oscillator 746, operating in this embodiment at a signal frequency of 14.35 GHz, band-stacks the received LHCP signals 748, 752 from two independent satellite dishes 764, 766 into signals 722, 720. Similarly, LNB 774 also includes signal frequency mixers 742 and 740 that are connected via local signal oscillator 744. Local signal oscillator 744, operating in this embodiment at a signal frequency of 11.25 GHz, band-stacks the received RHCP signals 750, 754 from two independent satellite dishes 764, 766 into signals 724, 726. Frequency stackers 716 and 718 then combine signals 720, 722, 724 and 726. LNB 774 also includes band translation block 702. Band translation block 702 receives combined signals and processes the requests for specific bands contained within the received signals. One skilled in the art will recognize that other circuit elements and different combinations of existing elements are possible and within the scope of this invention, including non-stacked frequency bands.

Band-stacked output signals from LNB 774 are identified as port 1 704 and port 2 706. Port 1 704 and port 2 706 may be connected to individual or multiple tuners that may request delivery of specific signal bands. Furthermore, the signals carried on output ports 704 and 706 from LNB 774 may also be connected to other RF processing elements, including but not limited to DiSEqC 2.0/XMT switching protocol detection unit 708, processing unit 712, voltage supplies 714 and power management unit 710.

While co-axial cables are mentioned as the transmission means between elements of the invention and between the invention and other elements of the overall DBS system, other methods may be used. For example, microstrip technology may be employed both for communication and for RF circuit elements.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A band translation switch comprising:
  a) at least first and second source selection switches, each one of the first and second source selection switches being operatively connected to each one of a plurality of sources, each of the first and second source selection switches comprising at least two inputs and a single output;
  b) a low band translator operatively connected to the single output of the first source selection switch; the low band translator having a first bypass switch having a first position in which the low band translator is in circuit, the first bypass switch further having a second position in which the low band translator is bypassed;
  c) a high band translator operatively connected to the single output of the second source selection switch; the high band translator having a second bypass switch having a first position in which the high band translator is in circuit, the second bypass switch further having a second position in which the high band translator is bypassed; and
  d) a frequency stacker having a first operative connection to the low band translator and having a second operative connection to the high band translator.

2. The band translation switch of claim 1, wherein the frequency stacker's first operative connection further comprises a low pass filter.

3. The band translation switch of claim 1, wherein the frequency stacker's second operative connection further comprises a high pass filter.

4. The band translation switch of claim 1, wherein each one of the plurality of sources comprises a coaxial cable carrying at least one band of RF data.

5. The band translation switch of claim 4, wherein the coaxial cable carries the at least one band of RF data from a satellite communications device.

6. The band translation switch of claim 1, further comprising: a) a third operative connection from the frequency stacker to a television converter device having at least a first and second tuner.

7. The band translation switch of claim 6, wherein the third operative connection comprises a separator.

8. The band translation switch of claim 7, wherein the first and second source selection switches are responsive to signals received from the at least first and second tuners.

9. The band translation switch of claim 1, further comprising: a) one or more cascadable outputs being operatively connected to one or more of the said plurality of sources.

* * * * *